A. A. TIRRILL.
ELECTRICAL REGULATOR.
APPLICATION FILED MAR. 3, 1914.

1,147,574.

Patented July 20, 1915.

WITNESSES:

INVENTOR
Allen A. Tirrill
BY
Wesley G. Carr
ATTORNEY

UNITED STATES PATENT OFFICE.

ALLEN A. TIRRILL, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL REGULATOR.

1,147,574.         Specification of Letters Patent.         Patented July 20, 1915.

Application filed March 3, 1914. Serial No. 822,130.

*To all whom it may concern:*

Be it known that I, ALLEN A. TIRRILL, a citizen of the United States, and a resident of Pittsburgh, in the county of Allegheny and State of Pennsylvania, have invented a new and useful Improvement in Electrical Regulators, of which the following is a specification.

My invention relates to electrical regulators, and it has for its object to provide an exceptionally simple and effective regulator of large capacity of the kind in which the regulation is effected by adjustment of the field excitation of a dynamo-electric machine.

In another application, Serial No. 653,010, filed October 5, 1911, I have set forth a regulator comprising a single, movable contact member that is carried by an electro-magnetically actuated lever, the position of which varies with the fluctuations of voltage in the regulated circuit, and another lever which supports and provides a fulcrum for the aforesaid lever, and is vibrated to effect engagement and disengagement of the movable contact member, with a stationary, but resiliently mounted, coöperating contact member.

The present invention is an improvement over the aforesaid regulator, and consists of additional relay devices, whereby the regulator is adapted to manipulate large amounts of current and is, therefore, caused to have a larger capacity.

Figure 1:
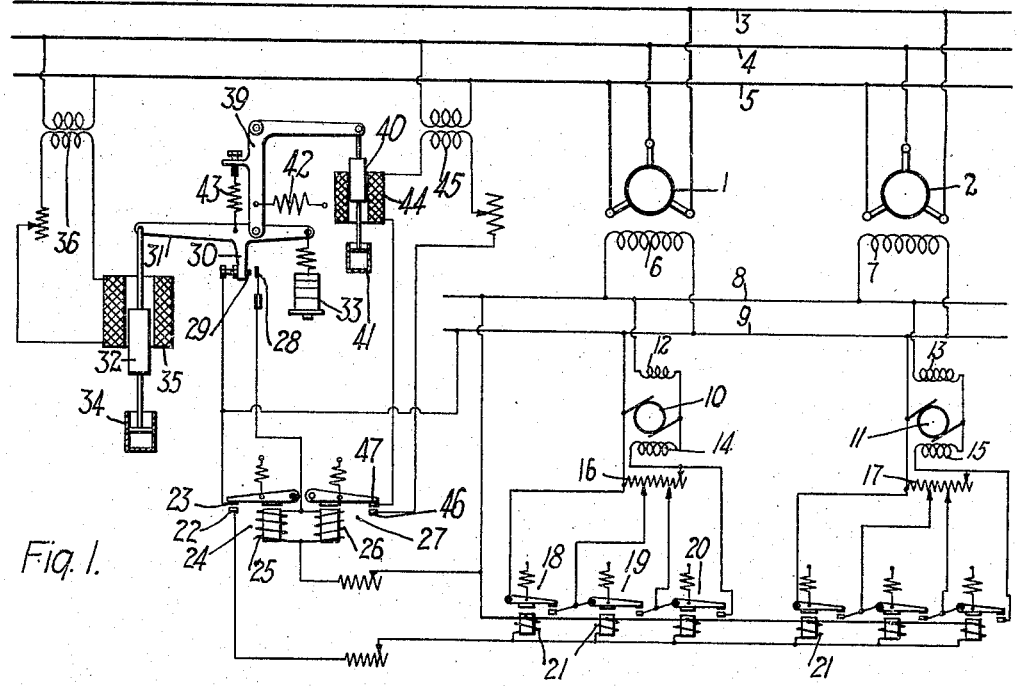
Figure 2:
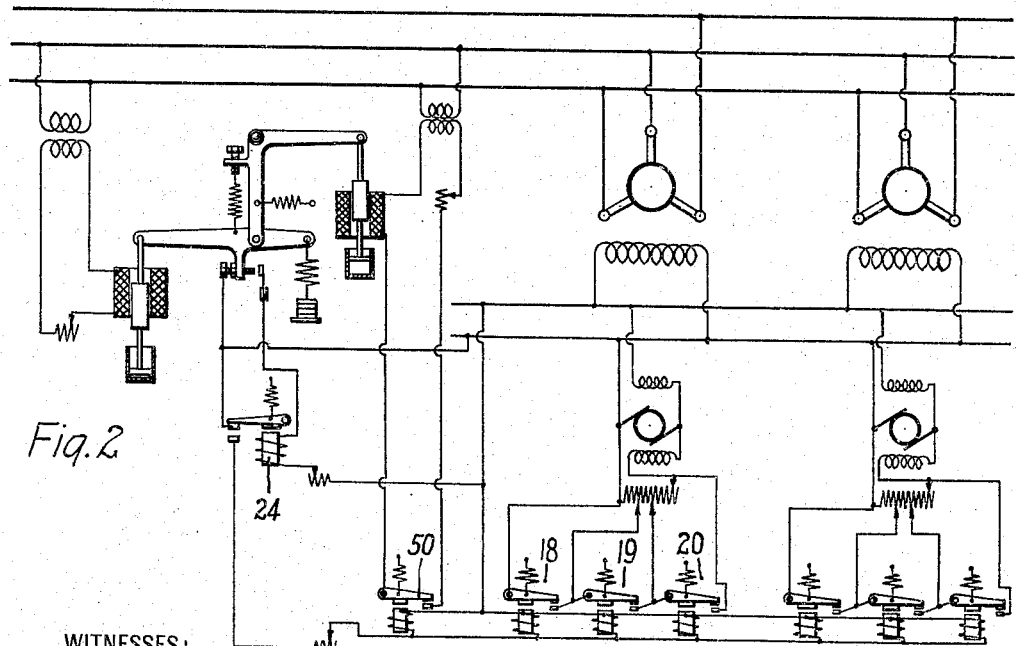

Figure 1 of the accompanying drawing diagrammatically illustrates a system of distribution embodying my invention, and Fig. 2 similarly illustrates a modification of the system of Fig. 1.

In the systems illustrated, a plurality of alternating current generators have their armatures 1 and 2 respectively connected to main bus bars or conductors 3, 4 and 5 of a suitable distributing circuit, and their field magnet windings 6 and 7 connected to exciter bus bars 8 and 9, to which the current is supplied from armatures 10 and 11 of two exciters. The exciters are provided with series field magnet windings 12 and 13 and shunt field magnet windings 14 and 15, having resistances 16 and 17 respectively in series therewith, the terminals and suitable intermediate points of which are respectively connected to the contact members of a plurality of relays 18, 19 and 20. The said relays are adapted to be simultaneously actuated, and, to that end, are provided with actuating windings 21 that receive current from the exciter bus bars 8 and 9, and the circuits of which are controlled by the stationary and movable contact members 22 and 23 of a relay 24. The relay 24 is provided with an actuating winding 25 that is connected in parallel with an actuating winding 26 for a similar relay 27, the said windings receiving current from the exciter bus bars 8 and 9, and being controlled by coöperating contact members 28 and 29, respectively, the former of which is stationary but resiliently mounted.

The contact member 29 is carried by, but is adjustable with respect to, a short depending arm 30 of a lever 31 which carries a magnetizable core 32 at one end and an adjustable counterweight 33 at its other end, the movements of the lever 31 being retarded by means of a dash pot 34. The magnetizable core 32 is actuated by a surrounding solenoid 35, upon which a voltage is impressed that is proportional to that of the distributing circuit 3—4—5, a transformer 36 being preferably interposed between the solenoid and the said circuit. Inasmuch as the degree of energization of the coil 35 is dependent upon the voltage of the distributing circuit 3—4—5, the position of the contact member 29 with respect to the member 28, or rather the distance between the said members, will also vary in accordance with the said voltage. The lever 31 is supported by, and is provided with a fulcrum at the lower end of, a substantially vertical arm of a bell crank lever 39 which carries, at the free end of its other arm, a magnetizable core 40, the movements of the said lever being retarded by means of a dash pot 41. The spring 42 serves to normally maintain the contact member 29 in engagement with the member 28, and spring 43, having its ends respectively attached to the levers 31 and 39, constitutes auxiliary means for adjusting the counterbalance of the lever 31. The lever 39 is actuated by a solenoid 44 that surrounds the magnetizable core 40 and receives current, preferably through transformer 45, from the distributing circuit 3—4—5, the circuit of the said solenoid being controlled by the stationary and movable contact members 46 and 47 of the relay 27.

In the operation of the regulator, the contact member 29 is vibrated into and out of engagement with the member 28 by means of the solenoid 44, the duration of the periods of engagement and disengagement of the said contact members being dependent upon the initial distances between them, which is determined by the voltage of the circuit 3—4—5. When the contact members 28 and 29 engage each other, the actuating coils 25 and 26, respectively, of the relays 24 and 27 are energized, and the contact members 23 and 47 are caused to engage the corresponding coöperating members 22 and 46, respectively. Engagement of the contact terminals 46 and 47 causes energization of the solenoid 44 which thereupon rotates the lever 39 to effect separation of the contact members 28 and 29. The engagement of the contact members 22 and 23 establishes a circuit through the actuating coils 21 of the relays 18, 19 and 20, which thereupon short circuit sections of the resistances 16 and 17 that are in circuit with the shunt field magnet windings 14 and 15 of the exciters. The result of this is the strengthening of the fields of the exciters and a corresponding increase of the voltage of the exciter bus bars 8 and 9. This, in turn, is followed by strengthening of the main generator field and corresponding raising of the voltage of the distributing circuit 3—4—5 to compensate for the previous decrease of the said voltage resulting from an increase of load.

The raising of the voltage of the distributing circuit causes a corresponding slight separation of the contact members 28 and 29. Disengagement of the said contact members, which is thus effected and also by the energization of the solenoid 44, interrupts the circuit of the windings 25 and 26 and thereby permits disengagement of the contact members 23 and 47 from the corresponding members 22 and 46. The actuating coils 21 of the relays 18, 19 and 20 thereupon become deënergized, and resistances 16 and 17 are again included in the active circuits of the exciter field windings 14 and 15. The result of this is the diminution of the voltage of the exciter bus bars 8 and 9 and a corresponding diminution of the voltage of the distributing circuit 3—4—5. The regulator continues to operate in this manner and thereby maintain the voltage of the circuits 3—4—5 substantially uniform.

Since the solenoid 44, which causes the contact members 28 and 29 to vibrate into and out of engagement, receives current directly from the distributing circuit 3—4—5, and since its energization is controlled by the said contact members and the relay 27, and is not dependent upon other changes effected in the system by the engagement and disengagement of the contact members 28 and 29, the regulator is very prompt in its operation. It is consequently practically possible to employ the relay 24 for controlling a plurality of other relays which, in turn, regulate the effective resistance of the exciter field circuit.

It has heretofore been impossible to obtain a practical degree of accuracy and promptness of regulation by employing two sets of relays between the main regulator contact members and the exciter field circuit, because, in previous regulators, the coil that vibrates the said main contact members into and out of engagement has not been sufficiently prompt and rapid in its effect upon the contact members. In the present regulator, there are no delays and, consequently, an additional relay or set of relays may be successfully employed. In previous regulators also, the number of relays that may be employed for short-circuiting portions of the exciter field rheostat is limited by the capacity of the main regulator contact members, whereas, in the present regulator, the number of such relays is limited only by the number of relays similar to relay 24, that can be handled by the main regulator contact members. By employing a plurality of relays similar to the relay 24, a very large number of auxiliary relays similar to relays 18, 19 and 20 may be controlled, and the regulator may be thereby adapted to have capacity for regulating a great many exciters of large capacity.

Instead of employing the relay 27 for controlling the circuit of the solenoid 44, an additional relay 50 similar to the relays 18, 19 and 20, may be utilized for that purpose, as shown in Fig. 2, the relay 50 being controlled by the relay 24 simultaneously with the relays 18, 19 and 20. This arrangement is permissible because of the promptness with which the regulator operates, for reasons hereinbefore explained.

I claim as my invention:

1. The combination with an electrical circuit, a dynamo-electric machine associated therewith, an exciter for the dynamo-electric machine having a field magnet winding, and a resistor in circuit with said winding, of a regulator comprising coöperating contact members, two windings for independently effecting relative movements of said members, relay mechanism controlled by said contact members and in turn controlling the circuit of one of said windings, and other relay mechanism also controlled by the aforesaid relay mechanism and in turn controlling the effective value of said resistor.

2. The combination with an electrical circuit, a dynamo-electric machine associated therewith, an exciter for the dynamo-electric machine having a field magnet winding, and a resistor in circuit with said winding, of a regulator comprising coöperating contact members, two windings for independently effecting relative movements of said members, relay mechanism controlled by said contact members, and other relay mechanism also controlled by the aforesaid relay mechanism and in turn controlling the effective value of said resistor, the circuit of one of said windings being controlled by one of said relay mechanisms.

3. The combination with an electrical circuit, a dynamo-electric machine associated therewith, an exciter for the dynamo-electric machine having a field magnet winding, and a resistor in circuit with said winding, of a regulator comprising coöperating contact members, two windings for independently effecting relative movements of said members, a plurality of relays controlled by said contact members one of which in turn controls the circuit of one of said windings, and a plurality of other relays controlled by the remainder of the aforesaid relays and in turn controlling the effective value of said resistor.

In testimony whereof, I have hereunto subscribed my name this 20th day of Feb. 1914.

ALLEN A. TIRRILL.

Witnesses:
  OTTO S. SCHAIRER,
  B. B. HINES.

Copies of this patent may be obtained for five cents each, by addressing the "Commissioner of Patents. Washington, D. C."